Patented Aug. 31, 1954

2,687,939

UNITED STATES PATENT OFFICE 2,687,939

ORGANIC COMPOUNDS USEFUL AS DYE-STUFFS AND INTERMEDIATES, AND FIBERS DYED THEREWITH

Mario Francesco Sartori, Wilmington, Del., assignor to E. I. du Pont de Nemours and Company, Wilmington, Del., a corporation of Delaware No Drawing. Application June 10, 1952,
Serial No. 292,737

9 Claims. (Cl. 8—55)

This invention relates to novel organic compounds useful as dyestuffs and as intermediates for other dyestuffs. More particularly, this invention deals with 6-bromo-5-amino-2,3-dimethyl-1,4-naphthoquinones which bear a non-acid substituent in the 8-position.

Accordingly, the novel compounds of this invention may be expressed by the general formula

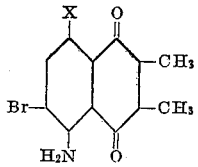

wherein X represents a neutral or basic substituent, for instance, Br, OH, NH₂ and alkyl or aryl amines. As convenient illustrations of alkyl amines, methylamine, dimethylamine, or any other lower mono alkyl and dialkyl amines having a total of not more than 6 C-atoms may be mentioned. As practical illustrations of the aryl amines, aniline, its homologs and halogen derivatives come into consideration.

I have found that compounds of the above general formula possess the remarkable property of dyeing hydrophobic fiber, such as nylon and cellulose acetate. Especially good results are obtained on polyester fiber such as polyethyleneterephthalate (commonly met with in commerce under the trade name "Dacron"). This quality is of most important practical value, inasmuch as hydrophobic fibers in general, and polyethylene terephthalate fiber in particular, are very selective as to the dyes that can be applied to them.

The dyes heretofore used for dyeing polyester fiber have suffered from a number of defects, among which are (a) lack of affinity for the fiber, which results in poor efficiency of dyeing and inability to get heavy shades of color, (b) lack of wash-fastness, (c) lack of light-fastness, and (d) tendency to form insoluble tars during the dyeing process, which damage the fabric. Even some dyes that have heretofore been used with good results upon cellulose acetate have not proven satisfactory when applied to polyester fibers.

It is therefore surprising and gratifying that the compounds of this invention have great affinity for polyester fiber and produce dyeings of excellent wash fastness and light fastness.

In addition, my novel compounds may be used as intermediates for preparing other dyestuffs. For instance, the compounds wherein X represents aniline or a homolog thereof may be sulfonated, to produce water-soluble compounds useful as dyestuffs for wool.

In preparing my novel compounds, I start with 2,3-dimethyl-1,4-naphthoquinone, and I subject this compound to nitration, which introduces a nitro group in the 5-position. Reduction with hydrosulfite, transforms this group into an amino group. But inasmuch as some reduction of the quinone ring (to the corresponding leuco compound) is likely to occur simultaneously, the reduction mass is aerated in the presence of an oxidation catalyst, such as nitrobenzene sodium sulfonate, to restore the compound to the quinone form.

Bromination of the compound thus produced, introduces two bromine atoms, into the 6,8-positions. Further reactions, along lines per se known, replace the Br atom in the 8-position by optional substituents, as already mentioned, for instance OH, NH₂, NH-phenyl, etc.

Without limiting my invention, the following examples are given to illustrate my preferred mode of operation. Parts mentioned are by weight.

PART I. PRELIMINARY

*Step A.—Preparation of 5-nitro-2,3-dimethyl-1,4-naphthoquinone*

4 parts of 2,3-dimethyl-1,4-naphthoquinone are added with stirring to a mixture of 50.4 parts of concentrated sulfuric acid and 16.8 parts of concentrated nitric acid at room temperature. The solution is then heated to 50° C. and held there for 1 hour while stirring. The mass is then cooled and poured carefully into 200–300 parts of ice water. A yellow precipitate is formed immediately which is filtered off, washed free of acid, sucked dry and then crystallized from acetic acid. The product is obtained in the form of yellow crystals which melt at 160° C., and show a C, H and N-analysis in agreement with the empirical formula $C_{10}H_3O_2(CH_3)_2.NO_2$.

*Step B.—Reduction to 5-amino compound*

A solution is made up of 45.4 parts of sodium hydroxide and 38 parts of sodium hydrosulfite in 356 parts of water. The temperature is adjusted to about 26°–34° C., and 6.3 parts of finely divided 2,3-dimethyl-5-nitro-1,4-naphthoquinone (from Step A) are added over a period of about 10 minutes while stirring. Agitation is continued for an additional 15 minutes; a little nitrobenzene sodium sulfonate is added, and air is bubbled through the mass until it is completely oxidized. The resulting red slurry is stirred an additional 30 minutes, filtered, washed free of alkali with cold water and dried. The precipitate is crystallized from an aliphatic hydrocarbon solvent boiling at about 120° C. ("Dependip"). 2,3-dimethyl-5-amino-1,4-naphthoquinone is obtained in the form of red crystals, melting at 135°–137° C.

PART II

*Example 1.—6,8-dibromo compound*

10 parts of 2,3-dimethyl-5-amino-1,4-naphthoquinone (from Step B above) are dissolved in 105 parts of glacial acetic acid, and 31.2 parts of bromine dissolved in 21 parts of glacial acetic acid are added over a period of about 30 minutes while agitating and holding the temperature at 25° C. The mixture is stirred at room temperature for 24 hours. It is then poured into 400 parts of ice-water with vigorous stirring. The brominated product separates as a red precipitate and is stirred for an hour. It is then filtered off, washed acid-free with cold water and dried. The precipitate is crystallized from ethanol. The red crystals thus obtained melt at 202–204° C. and possess an analysis agreeing with the formula for 6,8-dibromo-5-amino-2,3-dimethyl-1,4-naphthoquinone.

The compound dyes polyethylene terephthalate fibers an orange color.

*Example 2.—8-hydroxy compound*

To 10 parts of 20% oleum are added 2.9 parts of boric acid while stirring and heating at 45°–50° C. The mixture is stirred at 45°–50° C. for 30 minutes, and 3 parts of 2,3-dimethyl-5-amino-6,8-dibromo-1,4-naphthoquinone are added. The temperature is raised to 95°–100° C. and held there while the reaction mass is stirred for 2 hours. The mass is then cooled to room temperature and poured into 200 parts of ice water with vigorous agitation. The blue precipitate is filtered off, washed acid-free with cold water, dried and crystallized from ethanol. The dark blue crystals of 2,3-dimethyl-5-amino-6-bromo-8-hydroxy-1,4-naphthoquinone thus obtained melt above 280° C. and have an analysis agreeing with this name.

The compound dyes polyethylene terephthalate fibers a violet color. It also dyes cellulose acetate fibers a violet color.

*Example 3.—8-amino compound*

To 26 parts of o-dichlorobenzene are added 1.84 parts of p-toluene sulfonamide, 0.1 part of cuprous chloride, 1.1 part of sodium carbonate and 3 parts of 2,3-dimethyl-5-amino-6,8-dibromo-1,4-naphthoquinone (from Example 1). The mixture is stirred and heated at 120° C. for 16 hours. The reaction mass is cooled to 60° C., diluted with ethanol and filtered. The precipitate is crystallized from ethanol. The blue crystals are then stirred with 36 parts of concentrated sulfuric acid for 3 hours at room temperature. This mass is then poured into 200 cc. of ice water with vigorous agitation and stirred for 1 hour. The precipitate is filtered off, washed acid free with cold water, dried and crystallized from ethanol. The resulting dark blue crystals melt at 170°–175° C. and have an analysis agreeing with theory for 5,8-diamino-6-bromo-2,3-dimethyl-1,4-naphthoquinone.

The compound gives blue shades on polyethylene terephthalate and on cellulose acetate fibers.

*Example 4.—8-anilino compound*

A mixture of 10 parts of aniline, 1 part of 2,3-dimethyl-5-amino-6,8-dibromo-1,4-naphthoquinone, 0.7 part of potassium acetate and 0.2 part of cupric acetate is heated for 12 hours at 95°–100° C. The reaction mass is then slurried with ethanol and filtered. The filter cake is crystallized from benzene. 0.9 part of blue crystals is obtained melting at 230°–232° C. and agreeing in C, H, N and Br analysis with theory for 8-phenylamino-6-bromo-5-amino-2,3-dimethyl-1,4-naphthoquinone.

A chromatograph on alumina from a benzene solution shows only a single colored component to be present. The compound gives green blue shades on polyethylene terephthalate and cellulose acetate fibers.

In lieu of aniline in the above example, o-, m- or p-toluidine or any of the xylidines may be employed with similar results. Likewise, higher nuclear alkyl derivatives of aniline, for instance isopropyl aniline may be employed, but for good penetration into hydrophobic fiber, it is recommended to keep the total of C-atoms in the alkyl chains to not over 6 C-atoms.

*Example 5.—Chloroanilino derivative*

A mixture of 10 parts of 5-amino-6,8-dibromo-2,3-dimethyl-1,4-naphthoquinone, 60 parts of m-chloroaniline, 10 parts of potassium acetate and 5 parts of cupric acetate is heated on the steam bath for 8 hours. The reaction mass is cooled and slurried with 160 parts of ethyl alcohol, filtered, washed with water and then ethyl alcohol and dried. 6 parts of 5-amino-6-bromo-8-(m-chloroanilino)-2,3-dimethyl-1,4-naphthoquinone melting at 261° C. is obtained. A chromatograph of a benzene solution on alumina shows only a single colored blue component to be present.

In a similar manner other chloro and bromo derivatives, mono-, di- or tri-, may be employed to produce the corresponding dye compounds.

The practical values and advantages of my invention will now be readily appreciated. My novel compounds enable the dyeing of polyester fibers in heavy shades as well as light shades, as desired, and the dyeings thus obtained are of good fastness to light and to washing. They are also applicable to cellulose acetate and other hydrophobic fibers, such as nylon or polyacrylonitrile fibers. They may be applied to the fiber from an aqueous dispersion, which may or may not contain dyeing assistants, for instance benzoic acid, soap or other dispersing agents.

Dyeing may be achieved at the boiling point of the bath. After agitation of the dyebath, to ensure thorough mixing of the color, the fiber is entered, and the dyebath is kept at about 100° C. for 1 hour. The dye exhausts onto the fiber almost completely. The fabric is then removed and rinsed.

Dyeing may also be carried out under the recently developed high-temperature and pressure processes, and in this system it is of particular advantage that my novel compounds are essentially free of sublimation troubles. By this statement is meant that the novel dyes do not sublime off the fiber at the temperatures used in these processes, to contaminate the equipment.

I claim as my invention:

1. The compounds, 6-bromo-5-amino-2,3-dimethyl-1,4-naphthoquinones which bear in the 8-position a non-acid substituent selected from the group consisting of bromo, hydroxy, amino, alkylamino and the arylamino radicals of aniline, its lower alkyl derivatives and its halogen derivatives.

2. Hydrophobic fiber dyed with compounds as defined in claim 1.

3. Polyethylene terephthalate fiber dyed with compounds as defined in claim 1.

4. 8,6 - dibromo - 5 - amino - 2,3 - dimethyl-1,4-naphthoquinone.

5. 8 - hydroxy - 6 - bromo - 5 - amino - 2,3 - dimethyl-1,4-naphthoquinone.

6. 5,8 - diamino - 6 - bromo - 2,3 - dimethyl-1,4-naphthoquinone.

7. 8 - anilino - 6 - bromo - 5 - amino - 2,3 - dimethyl-1,4-naphthoquinone.

8. In a process of producing compounds as defined in claim 1, the step which comprises reacting with bromine upon 5-amino-2,3-dimethyl-1,4-naphthoquinone whereby to produce the corresponding 6,8-dibromo compound.

9. A process as in claim 8 including further the step of reacting the resulting 6,8-dibromo compound with reactants adapted to replace the 8-bromine atom by a substituent from the group consisting of hydroxy, amino, alkylamino and the arylamino radicals of aniline, its lower alkyl derivatives and its halogen derivatives.

No references cited.